United States Patent
Sulik et al.

(10) Patent No.: US 9,091,525 B2
(45) Date of Patent: Jul. 28, 2015

(54) METHOD FOR FOCUSING AN OBJECT PLANE AND OPTICAL ASSEMBLY

(75) Inventors: Wolfgang Sulik, Asslar (DE); Lambert Danner, Vienna (AU); Alexander Buettner, Weilburg (DE)

(73) Assignee: KLA-Tencor MIE GmbH, Weilburg (DE)

( * ) Notice: Subject to any disclaimer, the term of this patent is extended or adjusted under 35 U.S.C. 154(b) by 1201 days.

(21) Appl. No.: 12/931,886

(22) Filed: Feb. 14, 2011

(65) Prior Publication Data

US 2011/0205553 A1    Aug. 25, 2011

(30) Foreign Application Priority Data

Feb. 25, 2010 (DE) .......................... 10 2010 000 550

(51) Int. Cl.
*G01B 11/14* (2006.01)
*G01B 9/04* (2006.01)
*G02B 7/38* (2006.01)

(52) U.S. Cl.
CPC ... *G01B 9/04* (2013.01); *G02B 7/38* (2013.01)

(58) Field of Classification Search
CPC ... G01B 9/04; G01N 21/9501; G01N 21/6428
USPC ............. 356/237.1–237.5, 625, 512
See application file for complete search history.

(56) References Cited

U.S. PATENT DOCUMENTS

| | | | |
|---|---|---|---|
| 6,347,458 B1 | 2/2002 | Kaczynski | 33/503 |
| 6,812,446 B2 * | 11/2004 | Kreh | 250/201.3 |
| 6,875,972 B2 * | 4/2005 | Kreh | 250/201.4 |
| 6,879,440 B2 | 4/2005 | Cemic et al. | 359/385 |
| 6,960,755 B2 | 11/2005 | Kaczynsky | 250/221 |

(Continued)

FOREIGN PATENT DOCUMENTS

| | | |
|---|---|---|
| DE | 198 58 428 A1 | 7/2000 |
| DE | 101 06 699 A1 | 8/2002 |
| DE | 10 2004 023 739 | 12/2005 |

(Continued)

OTHER PUBLICATIONS

Dr. Carola Blasing: "Pattern Placement Metrology for Mask making," The presentation was given at the conference Semicon, Education Program, on Mar. 31, 1998 in Geneva.

*Primary Examiner* — Tarifur Chowdhury
*Assistant Examiner* — Iyabo S Alli
(74) *Attorney, Agent, or Firm* — Davidson, Davidson & Kappel, LLC

(57) ABSTRACT

A method for focusing an object plane (42) through an objective (30) and an optical assembly (10), with which the method can be carried out, are disclosed. A geometric reference structure (21) is positioned in a plane (36) conjugate to a field plane (34) of the objective (30) and is imaged onto the object plane (42). The geometric reference structure (21) is illuminated with a light beam (24), which encloses a non-zero angle ($\phi$) with a normal direction (38) of the conjugate plane (36). Therefore a position (Y) of an image (22) of the geometric reference structure (21) in the object plane (42) depends on the signed distance (37) between the object plane (42) and the field plane (34), and correspondingly is evaluated for the determination of the focus position. The optical assembly (10) preferentially may be a metrology tool (100) for measuring structures (120) on masks (100), wherein the objective (30) is the measurement objective of the metrology tool (100).

9 Claims, 6 Drawing Sheets

(56) References Cited

U.S. PATENT DOCUMENTS 7,420,670 B2    9/2008  Rinn et al. ................ 356/237.4
7,474,381 B2 *  1/2009  Abuku ............................ 355/53

FOREIGN PATENT DOCUMENTS

DE    10 2005 022 125 A1    11/2006
EP          1333 304 B1    8/2003

* cited by examiner

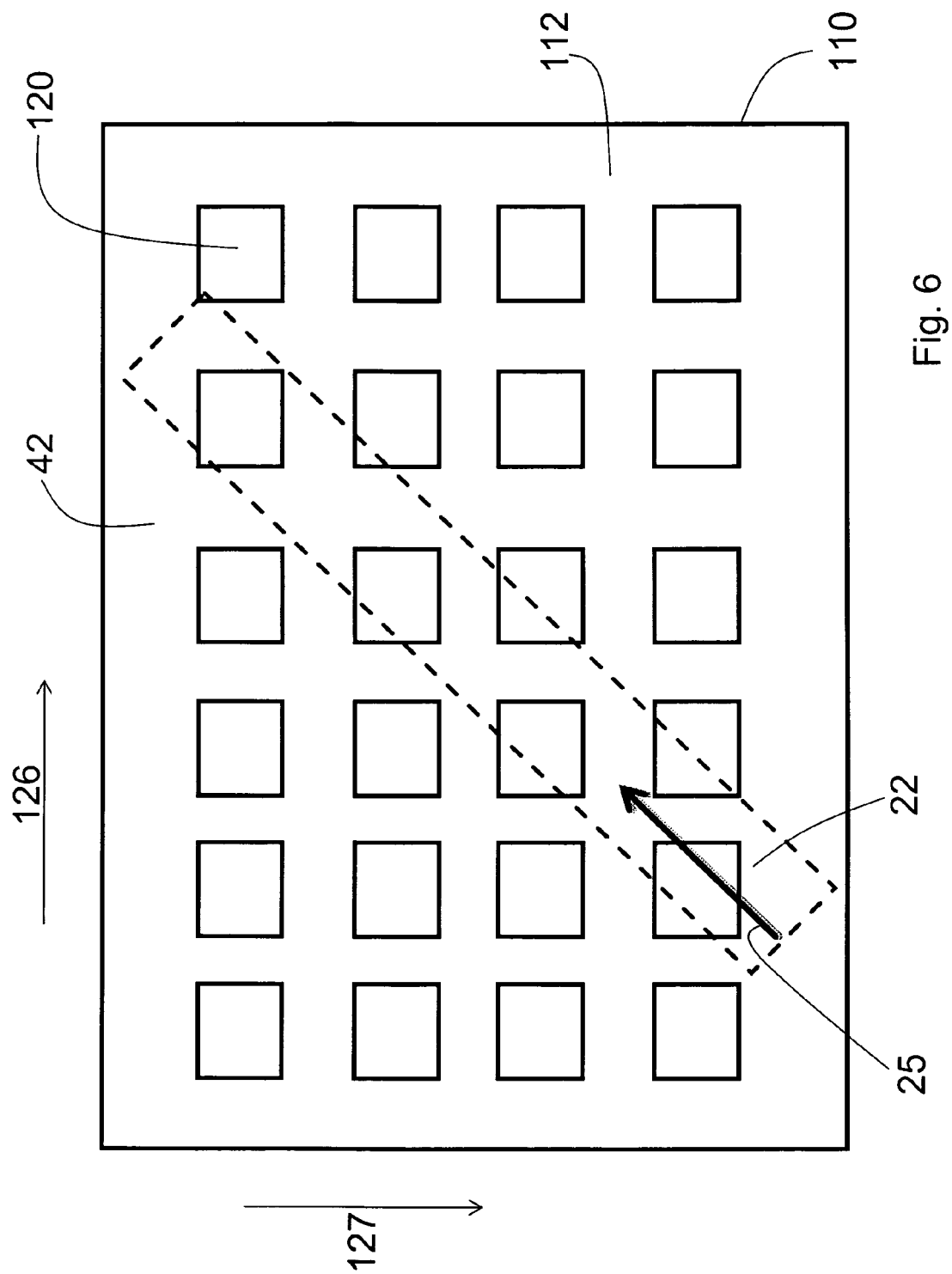

METHOD FOR FOCUSING AN OBJECT PLANE AND OPTICAL ASSEMBLY

CROSS REFERENCE TO RELATED APPLICATIONS

This application claims the benefits of German Patent Application No. 10 2010 000 550.9, filed Feb. 25, 2010, and hereby incorporated by reference herein.

FIELD OF THE INVENTION

The invention relates to a method for focusing an object plane and an optical assembly where the method is used.

BACKGROUND

European patent EP 1 333 304 B1 discloses an autofocus module and an autofocus method for a microscope-based system. To this end at least two light sources are provided, each of which produces a light beam for focusing. An optical means is provided, which directs a fraction of each light beam onto a coupling means coupling each light beam into the illumination light beam of the microscope-based system and directing it onto the object. A first and a second detector receive the light beam of the first and the second light source reflected from the surface of the object to be studied, and determine the intensities on the first and on the second detector by time division multiplexing.

U.S. Pat. No. 6,812,446 B2 describes an autofocus module for a system based on a microscope, in which a light source for a measurement light beam is provided. A first axicon generates an excentric, annularly diverging measurement light beam. A second axicon is provided for parallelising the remitted divergent measurement light beam. A differential diode is provided for determining the focus position.

U.S. Pat. No. 6,875,972 B2 relates to an autofocus module exhibiting a cylindrical lens between a detector element and a further optical means. For determining the focus position the cylindrical lens generates a line on the detector element. The detector element is rotatable about an axis in such a way that it is tilted to a settable degree with respect to a plane defined by the surface of the sample. All optical components of the autofocus module are arranged in a housing, which can easily be connected to an existing microscope-based system.

German patent application DE 10 2005 022 125 A1 describes a light-based scanning microscope with an excitation light path and a detection light path, means for scanning an object by moving an imaged spot, line, or multispot range over the object and an objective for imaging the spot, line, or multispot range. A focus setting mechanism is provided for the objective; the focus plane of the objective is detected by an autofocus system, which images different ranges of depth at the imaged spot, line, or multispot range to different locations of a space-resolving detector.

SUMMARY OF THE INVENTION

Some prior art focusing methods and/or systems require a plurality of specifically provided optical elements and operate with light wavelengths different from the operating wave length of the optical system for which the focus is to be set. This sometimes requires a compromise with respect to the imaging precision or increased efforts in the configuration of the optical system or of the focusing system. Many focusing methods involve complex evaluation methods. If a structured surface is to be focused, some prior art methods show a perturbing dependence on structures and edges. The last issue also is relevant for focusing methods in apparatuses for measuring structures on masks for photolithography.

It is an object of the present invention to provide a method for high precision focusing of an object plane which requires little effort.

The present invention provides a method which comprises the following steps:
a) illuminating a geometric reference structure positioned in the plane conjugate to the field plane of the objective with a light beam at a non-zero angle to a normal direction of the conjugate plane, wherein the field plane is the plane into which the object plane to be focused is to be brought;
b) imaging the geometric reference structure onto the object plane with the objective;
c) evaluating an image of the geometric reference structure in the object plane with respect to its position relative to a reference position in the object plane, wherein the reference position is determined by the objective and the position of the geometric reference structure within the conjugate plane, and corresponds to the position of the image in the object plane at optimal focusing; and
d) changing a relative distance between the objective and the object plane along the optical axis in dependence on the result of the evaluation in step c and repetition of the steps a to d, until the position of the image of the geometric reference structure in the object plane is within a pre-defined area about the reference position.

A further alternate or additional object of the invention is to provide an optical assembly allowing high precision focusing of an object plane by the optical assembly.

The present invention thus provides an optical assembly with:
an objective defining an optical axis;
a field plane;
a plane conjugate to the field plane;
a geometric reference structure provided in the conjugate plane; and
an illumination system configured to illuminate the geometric with a light beam, which encloses a non-zero angle with a normal direction of the conjugate plane, wherein the geometric reference structure is imaged onto an object plane by the objective in such a way that a position relative to a reference position of an image of the geometric reference structure in the object plane depends on a signed distance between the object plane and the field plane, wherein the reference position is determined by the optical assembly and corresponds to a position of the image of the geometric reference structure in the object plane, if the signed distance is zero, wherein the field plane is determined by the fact that in this case the object plane is optimally focused.

It is furthermore an alternate or additional object of the present invention to configure a metrology tool in such a way that a method for high precision focusing of an object plane of masks for photolithography is possible, without the metrology tool becoming significantly more expensive.

The present invention also provides a method for measuring positions of structures on a mask for photolithography. The method comprises the steps of:
a) providing a metrology tool
b) determining an object plane by a surface of the mask and the structures on the mask;
c) illuminating a geometric reference structure positioned in a plane conjugate to a field plane of an objective with a light beam at a non-zero angle to a normal direction of the conjugate plane, wherein the field plane is the plane into which the object plane to be focused is to be brought;

d) imaging a geometric reference structure onto the object plane with the objective e) aligning a geometric reference structure in such a way in a conjugate plane that at least one characteristic direction of an image of the geometric reference structure in the object plane is not parallel to at least one characteristic direction of the structures on the mask f) evaluating an image of the geometric reference structure in the object plane with respect to its position relative to a reference position in the object plane, wherein the reference position is determined by the objective and the position of the geometric reference structure within the conjugate plane, and corresponds to the position of the image in the object plane at optimal focusing; and g) changing a relative distance between the objective and the object plane along the optical axis in dependence on the result of the evaluation in step and repetition of the steps c to g, until the position of the image of the geometric reference structure in the object plane is within a pre-defined area about the reference position.

A geometric reference structure in the plane conjugate to the field plane is illuminated by a light beam. The light beam encloses a non-zero angle with the normal direction of the conjugate plane. Therein the field plane is characterized in that it is the plane into which the object plane to be focused is to be brought for focusing. The geometric reference structure for example is a regular pattern of regions of different transparency on a carrier. In a preferred embodiment the geometric reference structure is a slit.

The geometric reference structure may be imaged onto the object plane by the objective. In the object plane a reference position for the image of the geometric reference structure in the object plane is defined by the position of the geometric reference structure in the conjugate plane and by the imaging characteristics of the objective. Therein the reference position is the position the image would have at optimal focusing of the objective onto the object plane. As the light beam illuminating the geometric reference structure encloses a non-zero angle with the normal direction of the conjugate plane, the position of the image depends on the distance between the field plane and the object plane, i.e. on the focus position relative to the object plane. The position of the image thus moves in the object plane, if the object plane is moved perpendicular to the optical axis through a range containing the field plane, the position of which is the position at which the object plane is optimally focused. If the object plane is in the field plane, the image in the object plane is at the reference position.

Thus the focusing can be determined by determining the position of the image and a comparison with the reference position, and the relative distance between the objective and the object plane along the optical axis can be changed in dependence on the result of the comparison. This is done until the position of the image is within a pre-defined area about the reference position. Size and shape of this pre-defined area depend on the precision requirements for focusing in each case.

In embodiments of the method in addition to the position of the image of the geometric reference structure in the object plane the intensity and/or the edge sharpness of the image are taken into account for determining the focus position. If the object plane moves away from the field plane, in which it is optimally focused, not only the position of the image of the geometric reference structure in the object plane changes, but the image also becomes blurred.

In preferred embodiments of the method according to the invention the relation between the position of the image of the geometric reference structure in the object plane relative to the reference position and the focus position is sufficiently well known so that from the deviation between the position of the image and the reference position a correction of the relative distance along the optical axis between the objective and the object plane can be determined. Once this correction has been made, the object plane is in the field plane within a precision required for the focusing in the particular case, and the position of the image is within the pre-defined area about the reference position. Thus it is possible to determine the optimal focus position by imaging the geometric reference structure onto the object plane only once and determining only once the position of the image of the geometric reference structure in the object plane.

In preferred embodiments of the method at least part of the object plane is imaged by the objective and eyepiece optics onto a photosensitive element, like a CCD chip, in order to determine the position of the image of the geometric reference structure in the object plane.

In a preferred embodiment, which can be realized without particular effort and at low cost, the objective is associated with an optical assembly, which further comprises at least one light source emitting light of a particular wavelength (or light from a narrow spectral region) for illuminating an object in the object plane. Conditions in favour of a particularly high precision hold in this embodiment in particular if light of the same wavelength is used for illuminating the geometric reference structure. In this case the objective can be optimized for the wavelength used for illuminating the object in the object plane and at the same time simplified due to the restriction to one wavelength; the determination of the focusing then is done at the same wavelength and with the same objective, so that high precision is achieved with respect to the focusing, too. As the objective so to speak is co-used for the determination of the focus, such an embodiment is particularly cost-effective, as no corresponding separate optical elements are necessary and the objective need not be calculated and configured for a common focus position of different wavelengths.

The method, in various embodiments, can be carried out in such a way that different types of focusing, as required in a particular case, can be realized, for example integral focusing, selective focusing with variable focus position, multi-point focusing. Therein also the position of the geometric reference structure may be changed within the conjugate plane.

Apart from a person directly performing the method, which is possible in principle, in particular a computer-implemented realization of the method is possible, wherein the required evaluations are done by a computer, which also sends corresponding control signals to actuators, in order to effect the described position changes of the optical and of further elements.

An optical assembly providing the possibility of precise focusing of an object plane with little constructive effort and at low cost, and which exhibits an objective by which an optical axis, a field plane and a plane conjugate to the field plane are defined, is characterized by an illumination system configured to illuminate a geometric reference structure provided in the conjugate plane with a light beam, which encloses a non-zero angle with a normal direction of the conjugate plane. The geometric reference structure therein is imaged onto an object plane by the objective in such a way that a position of an image of the geometric reference structure relative to a reference position of the image of the geometric reference structure in the object plane depends on a signed distance between the object plane and the field plane. The reference position is determined by the optical assembly and corresponds to a position of the image of the geometric reference structure in the object plane, if the signed distance is zero, wherein the field plane is determined by the fact that in this case the object plane is optimally focused.

In a preferred embodiment the light source for the illumination system is a laser. The illumination system further comprises a diffusion disc, in order to generate a sufficient divergence of the laser beam. In such a set-up speckles can appear; this problem is addressed in an embodiment wherein the diffusion disc is configured to rotate about an optical axis of the illumination system.

In embodiments of the invention the optical assembly comprises at least one light source configured to emit light of one wavelength for the illumination of an object in the object plane. In an advantageous embodiment the at least one light source is also configured to provide light for the illumination system for illuminating the reference structure.

In embodiments of the invention the optical assembly comprises a camera exhibiting a photosensitive element, onto which at least part of the object plane can be imaged by the objective. If this camera is also provided for determining the position of the image of the geometric reference structure in the object plane, a simplified configuration and a cost advantage result.

In a particularly preferred embodiment the optical assembly is a metrology tool for measuring structures on a mask for photolithography. The object plane is located in a range between the surface of the mask and the top side of at least part of the structures on the mask. The objective of the optical assembly is the measurement objective of the metrology tool. The measurement objective is optimized for a narrow wavelength range and, due to the restriction to this wavelength range, is of a simplified construction. Advantageously light from this narrow wavelength range is used for illuminating both the mask surface and the geometric reference structure. Therein it is particularly preferred that the light is provided by a common light source; this can be a laser.

A metrology tool for measuring structures on wafers and on masks used for their production is described in detail in the presentation manuscript "Pattern Placement Metrology for Mask Making" by Dr. Carola Bläsing, distributed at the conference Semicon, Education Program in Geneva on Mar. 31, 1998. The description there refers to the fundamentals of a metrology tool. Furthermore, a metrology tool is known from a plurality of patent applications, like for example DE 198 58 428 A1, DE 101 06 699 A1, or DE 10 2004 023 739 A1.

The structures on a mask measured in the metrology tool usually are arranged in such a way on the mask that at least one characteristic direction is defined by them. If the method according to the invention is used to focus the measurement objective of the metrology tool on an object plane in the vicinity of the surface of the mask, it is advantageous to align the geometric reference structure in the conjugate plane in such a way that at least one characteristic direction of the image of the geometric reference structure in the object plane is not parallel to the at least one characteristic direction defined by the structures on the mask. It is advantageous if there is no characteristic direction of the image of the geometric reference structure which is parallel to a characteristic direction defined by the structures on the mask. If the geometric reference structure for example is a slit, and the structures on the mask exhibit two characteristic directions perpendicular to each other, an advantageous configuration is obtained if the image of the slit in the object plane encloses a non-zero angle with each of the two characteristic directions defined by the structures on the mask, for example an angle of 45°.

BRIEF DESCRIPTION OF THE DRAWINGS

Below embodiments shall illustrate the invention and its advantages with reference to the accompanying figures.

FIG. 6 schematically shows a top view of a mask.

DETAILED DESCRIPTION

Figure 1:
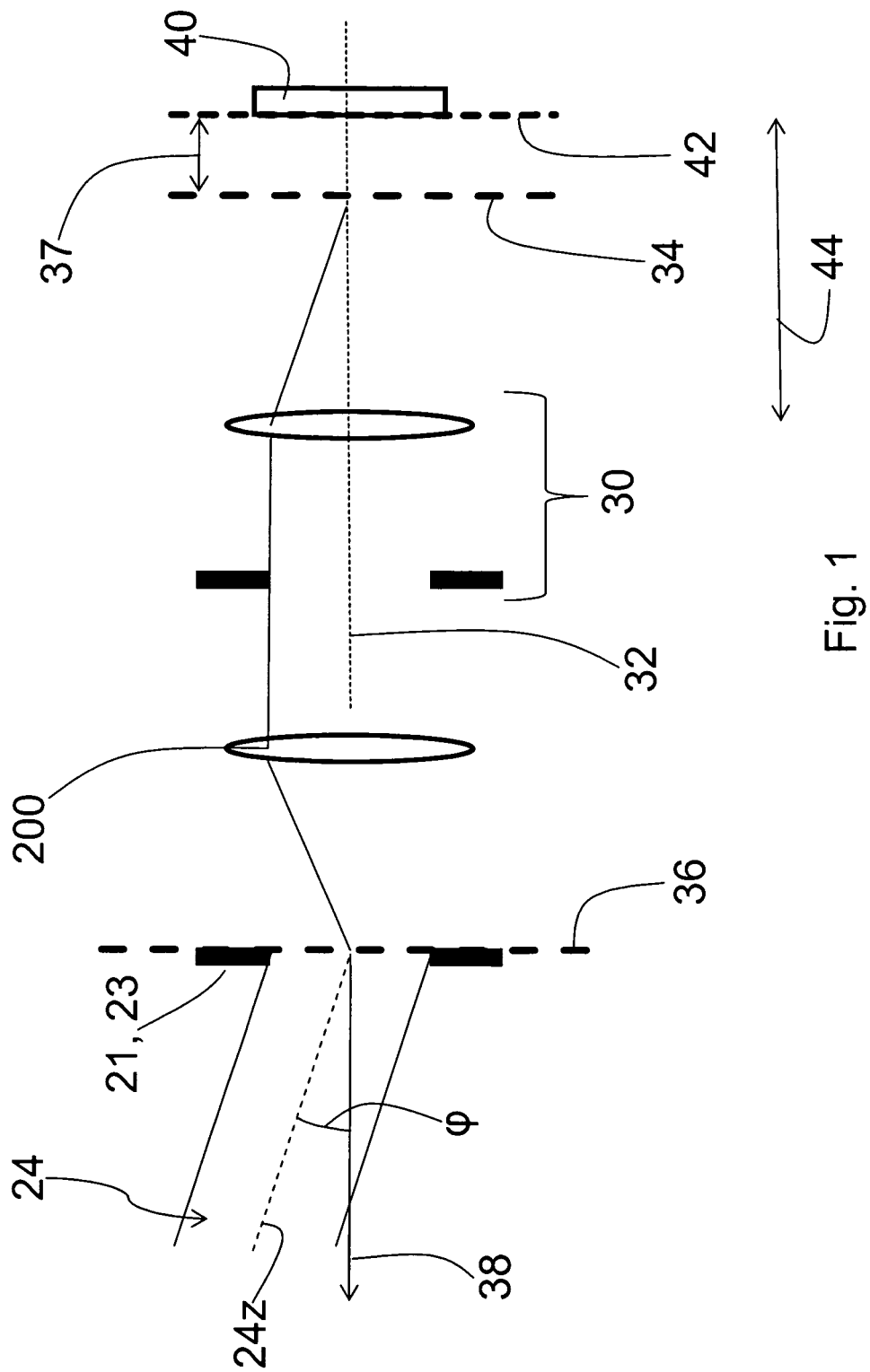
FIG. 1 shows the essential configuration of an optical assembly according to the invention.

Identical reference numerals are used for like elements of the invention or elements of like function. Furthermore, for the sake of clarity, only those reference numerals are shown in the figures which are necessary for the description of the respective figure or for establishing the relation between the respective figure and the context of the other figures. For reasons of clear graphical representation the individual elements in the figures are not necessarily drawn to scale, i.e. the size ratios of elements in the graphical representation can differ from the real size ratios of the respective elements.

FIG. 1 shows a configuration of an optical assembly according to the invention, with which the method according to the invention can be performed. An optical axis 32, a field plane 34, and a plane 36 conjugate to the field plane 34 are defined by an objective 30. An object plane 42 is determined by an object 40; this object plane 42 is to be focused with the objective 30; optimal focusing is achieved, if the field plane 34 and the object plane 42 coincide. Furthermore a relative distance 44 between the objective 30 and the object plane 42 along the optical axis 32 as well as a distance 37 between the field plane 34 and the object plane 42 along the optical axis 32 are defined. The distance 37 is signed, i.e. exhibits a positive or negative sign. A change of the relative distance 44 between the objective 30 and the object plane 42 implies a change of the distance 37 between the field plane 34 and the object plane 42. A change of the distance 37 between the field plane 34 and the object plane 42 implies a change of the relative distance 44 between the objective 30 and the object plane 42. In the conjugate plane 36 there is located a geometric reference structure 21, which in the embodiment shown is a slit 23. The geometric reference structure 21 is illuminated with a light beam 24 enclosing a non-zero angle φ with a normal direction 38 of the conjugate plane 36. More precisely the angle φ refers to the angle between a central ray 24z of the light beam 24 and the normal direction 38 of the conjugate plane 36. As indicated in the figure, further optical elements 200 may be arranged between the objective 30 and the geometric reference structure 21.

Figure 2:
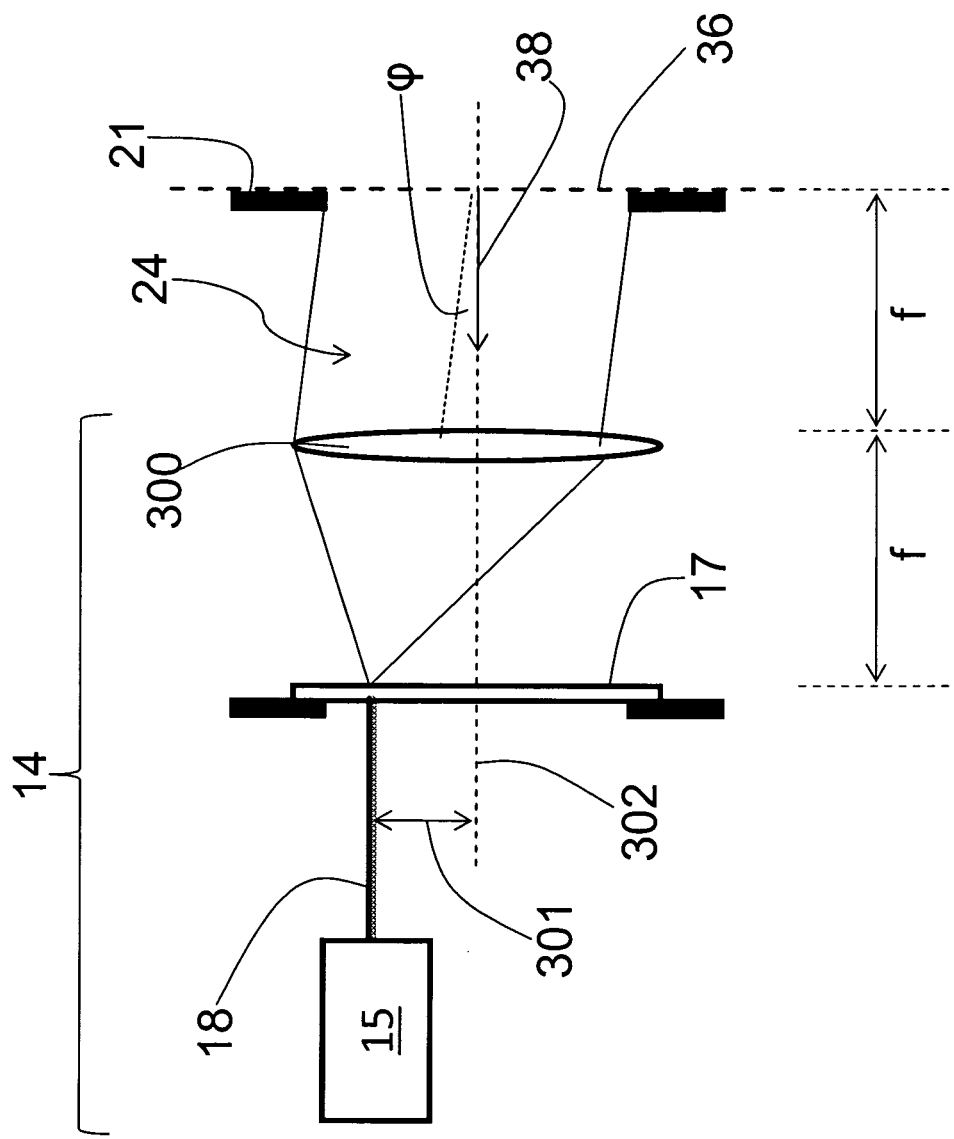
FIG. 2 shows an embodiment of the illumination system for the geometric reference structure.

FIG. 2 shows an embodiment of an illumination system 14 for the geometric reference structure 21 in the conjugate plane 36, for illuminating the geometric reference structure 21 with a light beam 24, as mentioned in the description of FIG. 1. A laser 15 emits a beam 18 onto a diffusion disc 17. A lens 300 is positioned between the diffusion disc 17 and the geometric reference structure 21, exhibiting a distance f to both the diffusion disc 17 and the geometric reference structure 21, which is equal to the focal distance of the lens 300. The beam 18 of the laser 15 therein is displaced by a distance 301 from the optical axis 302 of the illumination system 14. Therefore the light beam 24 formed by the lens 300 exhibits a non-zero angle φ with respect to the normal direction 38 of the conjugate plane 36. Perturbations by laser speckles possible in this set-up can be countered by rotating the diffusion disc 17 about the optical axis 302 of the illumination system.

Figure 3:
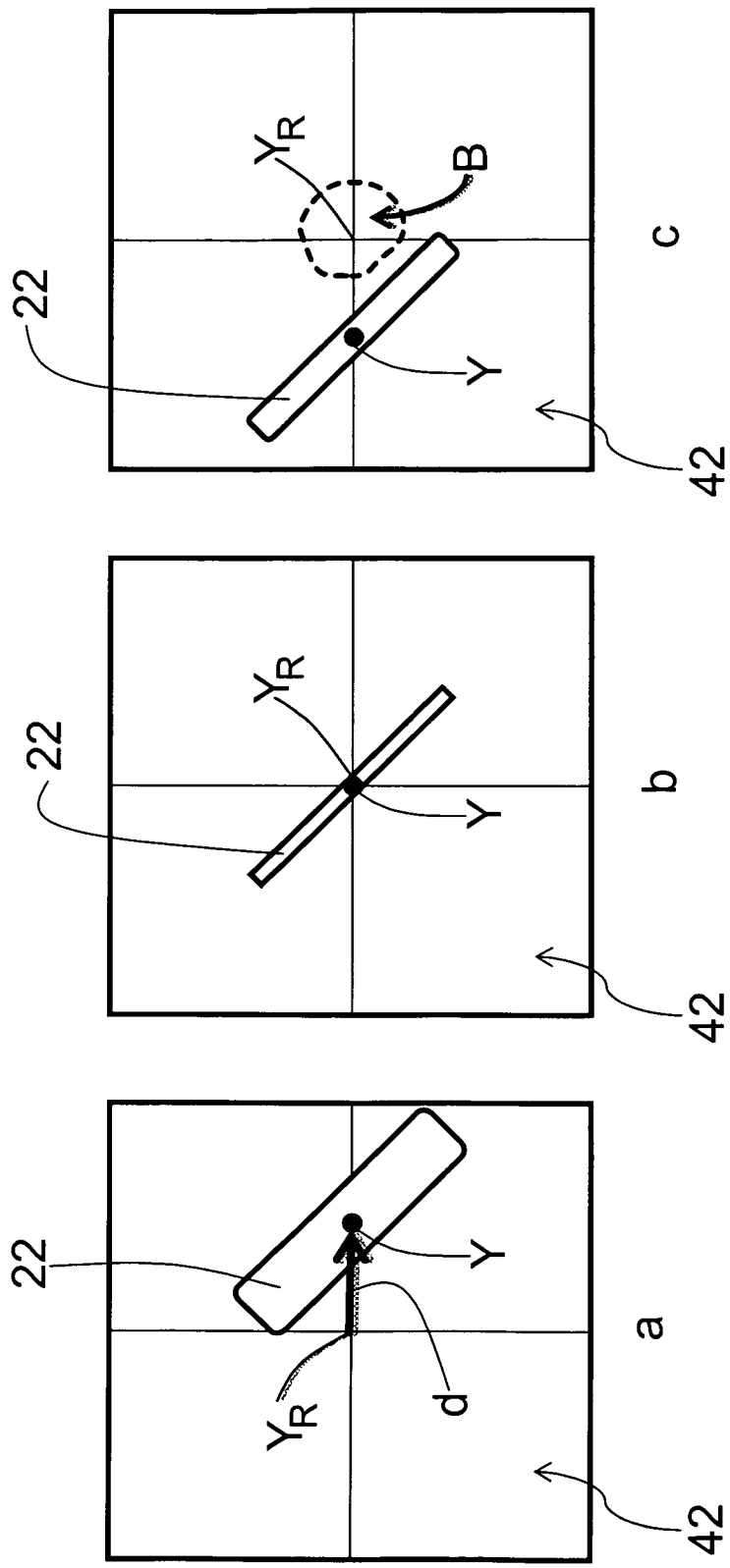
FIG. 3 shows the dependence of the position of the image of the geometric reference structure in the object plane on the focus position.

FIG. 3 schematically shows a part of the object plane 42 with an image 22 of the geometric reference structure 21 (see FIGS. 1 and 2), which, in the embodiment shown, is a slit 23 (see FIG. 1). The position Y of the image 22 in the object plane 42 is indicated by a filled black circle. A reference position $Y_R$ of the image 22 is defined by the objective 30 (see FIG. 1) and the position of the geometric reference structure 21 within the conjugate plane 36 (see FIGS. 1 and 2). The position Y of the image 22 coincides with the reference position $Y_R$, if the object plane 42 is optimally focused, i.e. if the object plane 42 and the field plane 34 (see FIG. 1) coincide, which implies that in this case the signed distance 37 (see FIG. 1) between the field plane 34 and the object plane 42 is zero. The situation at optimal focusing is shown in subfigure b. If the object plane 42 is moved away from the field plane 34, i.e. the optimal focus position is abandoned, the image 22 on the one hand becomes blurred, as indicated in the figure. Furthermore, the position Y of the image 22 changes, too. This is a consequence of the illumination of the geometric reference structure 21 at a non-zero angle φ (see FIGS. 1 and 2) with respect to the normal direction 38 (see FIGS. 1 and 2) of the conjugate plane 36 (see FIGS. 1 and 2). Therein the direction of the deviation d of the position Y from the reference position $Y_R$ depends on the sign of the signed distance 37. For the sake of clarity the deviation d is shown only in subfigure b. Thus for example subfigure a corresponds to a situation in which the object plane 42 is closer to the objective 30 than the field plane 34; and subfigure c for example corresponds to a situation in which the object plane 42 is at a larger distance from the objective 30 than the field plane 34. For the sake of clarity only in subfigure c an area B about the reference position $Y_R$ is shown, which is pre-defined in accordance with the requirements as to precision of the focusing. A focusing is accepted as sufficient, if the position Y of the image 22 lies within the area B. As indicated in the figure, the area B may exhibit an irregular boundary. In embodiments a correction for the signed distance 37 between the object plane 42 and the field plane 34, by which an optimal focusing, at least within the precision corresponding to the area B, is achieved, may be determined directly from a single image 22 of the geometric reference structure 21 in the object plane 42 and the deviation d of its position Y from the reference position $Y_R$.

Figure 4:
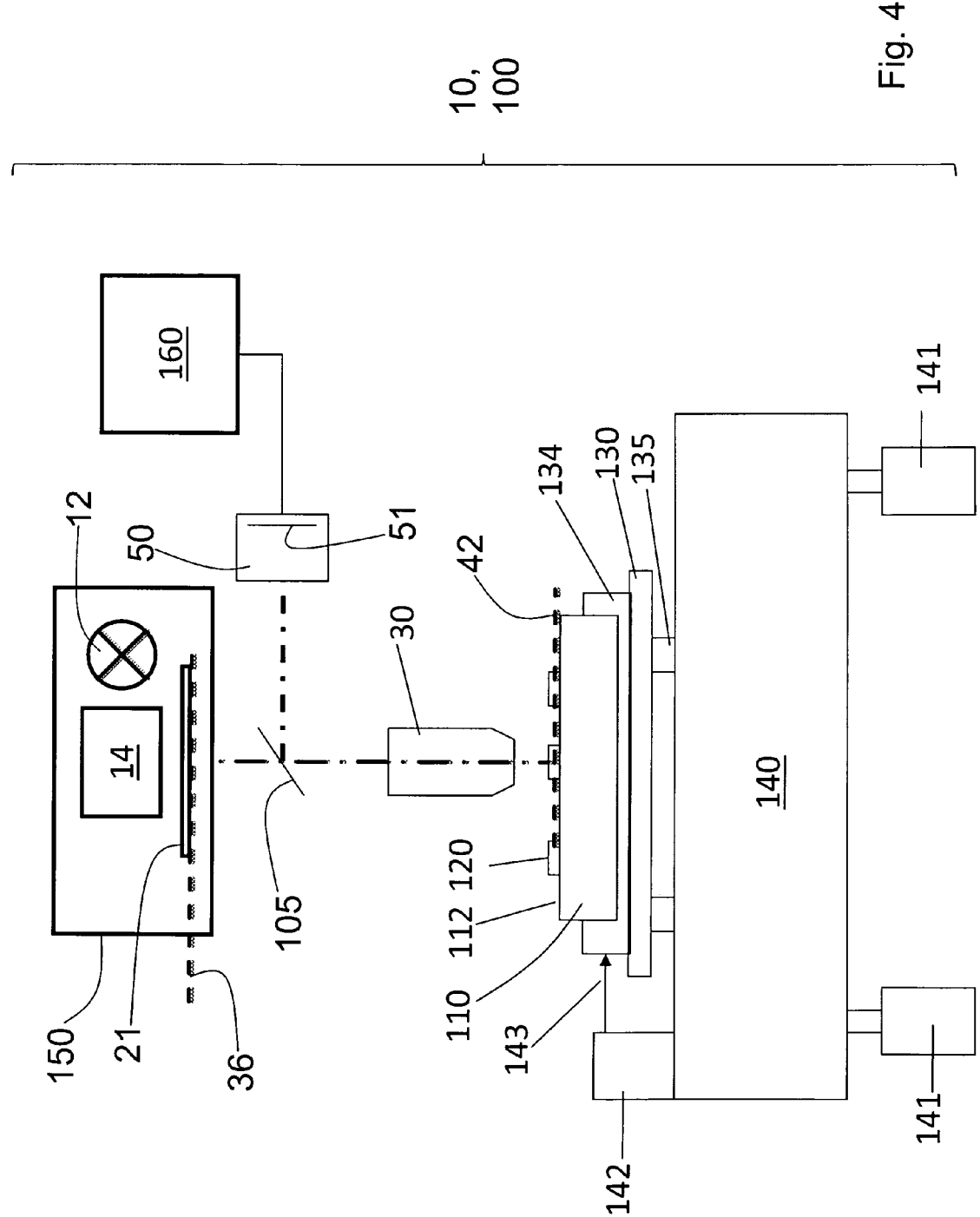
FIG. 4 shows an optical assembly according to the invention, which is a metrology tool.

FIG. 4 shows an optical assembly 10 according to the invention, which is a metrology tool 100. A mask 110 exhibiting the structures 120 to be measured on a surface 112, is placed into a mask holder 134 on a measurement stage 130. The measurement stage 130 is supported by bearings 135 on a base 140 and is movable. In preferred embodiments the bearings 135 are air bearings, and the base 140 is a block of granite. The motion of the measurement stage 130 on the base 140 is determined by at least one laser-interferometer 142, emitting at least one measuring laser beam 143. The base 140, and with it the metrology tool 100, is largely decoupled from ground vibrations by vibration-damped supports 141. An objective 30 of the optical assembly 10 is configured as a measurement objective of the metrology tool 100. In the embodiment shown it is provided both for measuring structures 120 on the surface 112 of the mask 110 and for focusing an object plane 42, which is determined by the surface 112 of the mask 110 and the structures 120, see FIG. 5. Light from a wavelength range for which the objective 30 is designed and optimized, is emitted from a light source 12, which is located in an illumination unit 150. The illumination unit 150 further comprises a geometric reference structure 21, which according to the invention is used in focusing the object plane 42, and which is located in a plane 36 conjugate to a field plane 34 (see FIG. 1) of the objective 30, and an illumination system 14 for illuminating the geometric reference structure 21. The light source 12 in this embodiment provides both the light for the illumination system 14 and for illuminating the surface 112 of the mask 110 when measuring the structures 120, so that in this embodiment also the focusing is done with light from the wavelength range for which the objective 30 is optimized.

At least part of the surface 112 of the mask 110 is imaged onto a photosensitive element 51 in a camera 50 by the objective 30; in the embodiment shown this is done with the co-operation of a beam splitter 105. The photosensitive element for example is a CCD chip. The image in the camera 50 is evaluated, both for measuring the structures 120 on the surface 112 of the mask 110 and while performing the focusing method according to the invention. For this evaluation in this embodiment a data processing unit 160 is provided, by which also control signals to the metrology tool can be generated, which lead to a change of the relative distance 44 (see FIG. 1) of objective 30 and object plane 42, and thus to a change of the signed distance 37 (see FIG. 1) between the field plane 34 (see FIG. 1) and the object plane 42. The determination, and if necessary correction, of the focus position may be performed prior to a measurement of the structures 120 or several times during the measurement of the structures 120. At times when no determination of the focus position is necessary the illumination system 14 for the geometric reference structure 21 is deactivated, so as not to interfere with the measurement of the structures 120.

A configuration of the optical assembly according to the invention as a metrology tool is not limited to the set-up of a metrology tool as shown. A metrology tool in which the invention is used may for example exhibit further objectives, beam paths, cameras, and further optical elements.

Figure 5:
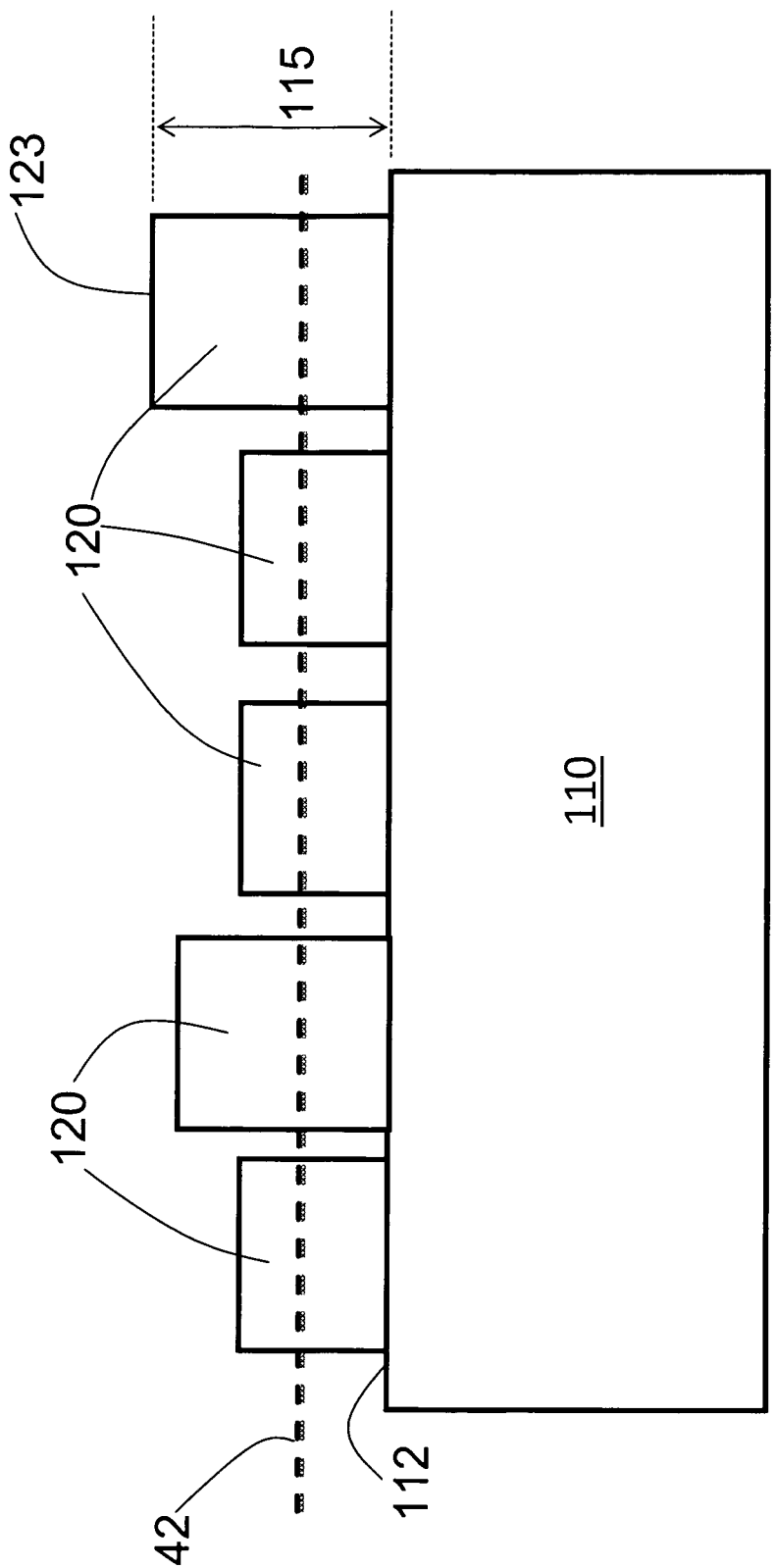
FIG. 5 schematically shows a cross-section of a mask.

FIG. 5 schematically shows a cross-section of a mask 110 exhibiting structures 120 to be measured on a surface 112. The object plane 42 here is chosen from a range 115 extending from the surface 112 of the mask 110 to a top side 123 of at least part of the structures 120. The precise position of the object plane 42 in the range 115 to be focused by the optical assembly 10 according to the invention according to the method according to the invention, is chosen depending on the task when measuring the structures 120.

FIG. 6 schematically shows a top view of a mask 110 exhibiting structures 120 to be measured on a surface 112. The arrangement of the structures 120 on the surface 112 exhibits a first characteristic direction 126 and a second characteristic direction 127. Furthermore an image 22 of the geometric reference structure 21 (see FIGS. 1 and 2) shaped as a slit 23 (see FIG. 1) is shown in the object plane 42. The image 22 exhibits a characteristic direction 25 which is parallel neither to the first characteristic direction 126 nor to the second characteristic direction 127. In this way perturbing effects of the structures 120 on the focusing can be reduced.

The invention has been described with reference to specific embodiments. Alterations and modifications are possible, without leaving the scope of the subsequent claims. The optical assembly has been described in particular as a metrology tool. This, however, does not imply that the method according to the invention or the configuration of the optical assembly according to the invention are limited to metrology tools.

What is claimed is:

1. A method for focusing an object plane through an objective defining an optical axis, a field plane, and a plane conjugate to the field plane, comprising the following steps:
   a) illuminating a geometric reference structure positioned in the plane conjugate to the field plane of the objective with a light beam at a non-zero angle to a normal direction of the conjugate plane, wherein the field plane is the plane into which the object plane to be focused is to be brought;
   b) imaging the geometric reference structure onto the object plane with the objective;
   c) evaluating an image of the geometric reference structure in the object plane with respect to its position relative to a reference position in the object plane, wherein the reference position is determined by the objective and the position of the geometric reference structure within the conjugate plane, and corresponds to the position of the image in the object plane at optimal focusing; and
   d) changing a relative distance between the objective and the object plane along the optical axis in dependence on the result of the evaluation in step c and repetition of the steps a to d, until the position of the image of the geometric reference structure in the object plane is within a pre-defined area about the reference position.

2. The method as recited in claim 1 wherein additionally an intensity and/or an edge sharpness of the image of the geometric reference structure in the object plane is taken into account in the evaluation.

3. The method as recited in claim 1 wherein from the position relative to the reference position of the image of the geometric reference structure in the object plane a correction of the relative distance between the objective and the object plane along the optical axis is determined, by which, within a required precision, an optimal focusing is achieved.

4. The method as recited in claim 1 wherein the geometric reference structure is a slit.

5. The method as recited in claim 1 wherein at least a part of the object plane is imaged onto a photosensitive element by the objective for the evaluation of the image of the geometric reference structure in the object plane with respect to its position in the object plane.

6. The method as recited in claim 1 wherein the objective is associated with an optical assembly, and the optical assembly comprises at least one light source emitting light of a wavelength for illuminating an object in the object plane.

7. The method as recited in claim 6 wherein light of the same wavelength as the wavelength is used for illuminating the geometric reference structure.

8. The method as recited in claim 1 wherein the focusing comprises at least: integral focusing, selective focusing with variable focus position or multi-point focusing.

9. A method for measuring positions of structures on a mask for photolithography comprising the steps of:
   a) providing a metrology tool;
   b) determining an object plane by a surface of the mask and the structures on the mask;
   c) illuminating a geometric reference structure positioned in a plane conjugate to a field plane of an objective with a light beam at a non-zero angle to a normal direction of the conjugate plane, wherein the field plane is the plane into which the object plane to be focused is to be brought;
   d) imaging the geometric reference structure onto the object plane with the objective;
   e) aligning the geometric reference structure in such a way in the conjugate plane that at least one characteristic direction of an image of the geometric reference structure in the object plane is not parallel to at least one characteristic direction of the structures on the mask;
   f) evaluating an image of the geometric reference structure in the object plane with respect to its position relative to a reference position in the object plane, wherein the reference position is determined by the objective and the position of the geometric reference structure within the conjugate plane, and corresponds to the position of the image in the object plane at optimal focusing; and
   g) changing a relative distance between the objective and the object plane along the optical axis in dependence on the result of the evaluation in step and repetition of the steps c to g, until the position of the image of the geometric reference structure in the object plane is within a pre-defined area about the reference position.

\* \* \* \* \*